No. 856,916. PATENTED JUNE 11, 1907.
K. SCHAAL.
HARROW ATTACHMENT.
APPLICATION FILED SEPT. 19, 1906.
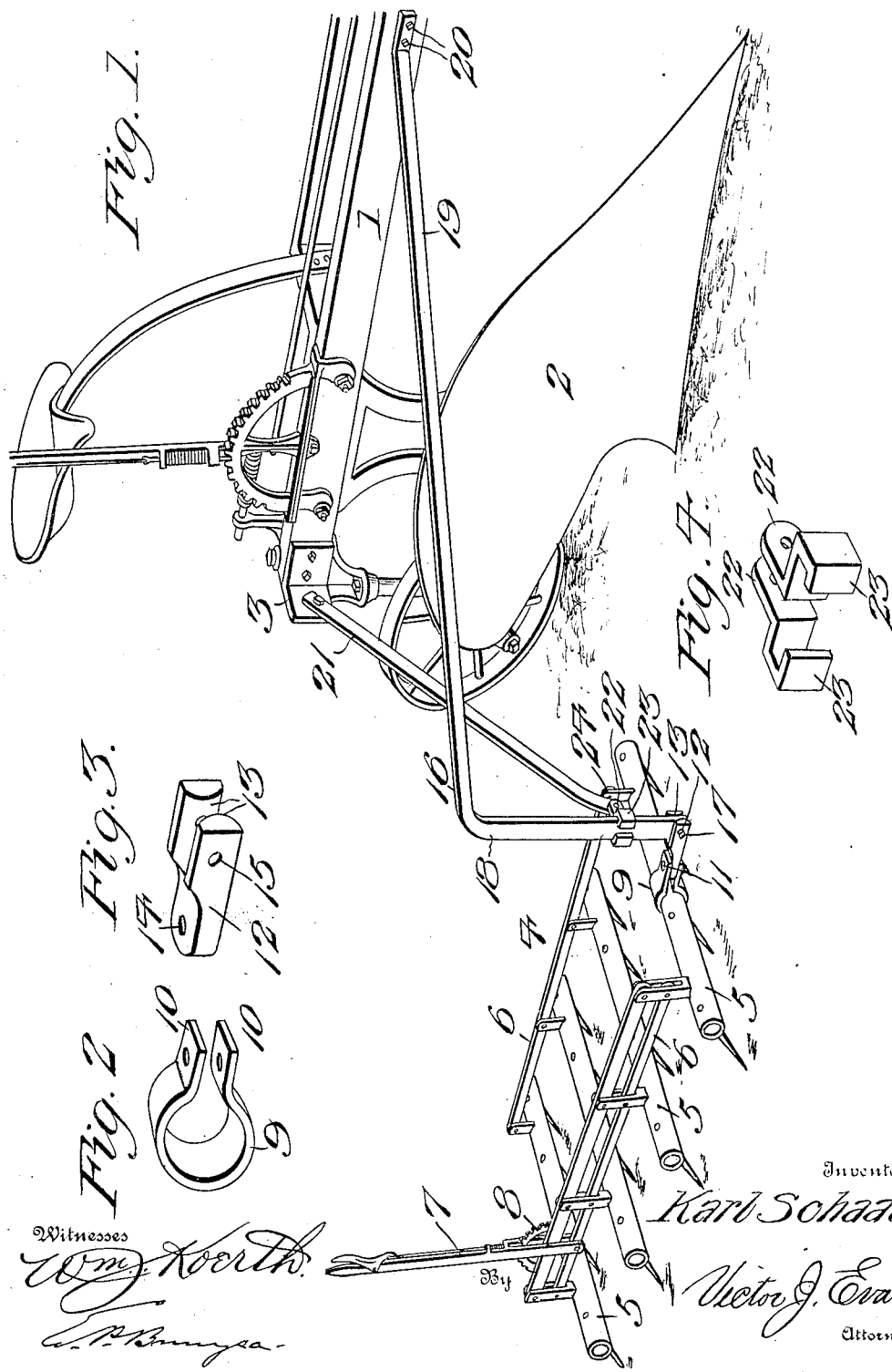

UNITED STATES PATENT OFFICE.

KARL SCHAAL, OF SEWARD, NEBRASKA.

HARROW ATTACHMENT.

No. 856,916.  Specification of Letters Patent.  Patented June 11, 1907.

Application filed September 19, 1906. Serial No. 335,301.

*To all whom it may concern:*

Be it known that I, KARL SCHAAL, a citizen of the United States of America, residing at Seward, in the county of Seward and State of Nebraska, have invented new and useful Improvements in Harrow Attachments, of which the following is a specification.

This invention relates to harrow attachments and one of the principal objects of the same is to provide means for attaching a harrow to an ordinary plow which will not interfere with the turning of the furrow slice.

Another object of the invention is to provide means for attaching a harrow to a plow which will not interfere with the tilting or rocking movements of the harrow as it is drawn over the ground at the mold board side of the plow.

Another object of my invention is to provide simple braces and clamps for connection to a plow and to a harrow which can be quickly detached from either the harrow or the plow or both so that either implement may be used independently of the other.

The foregoing and other objects may be attained by means of the construction illustrated in the accompanying drawings, in which:

Figure 1 is a perspective view of a plow and harrow connected together by means constructed in accordance with my invention. Fig. 2 is a perspective view of a clevis connected to the front bar of the harrow. Fig. 3 is a perspective view of a link pivotally connected to the clevis and to a brace leading from the plow. Fig. 4 is a perspective view of a two-part clamp for connecting the two braces together.

Referring to the accompanying drawings for a more particular description of my invention, the numeral 1 designates the beam of an ordinary plow and 2 is the mold board thereof. Connected to the rear end of the beam 1 is a bracket 3 which may be of any suitable shape to conform to the shape of the beam of the plow. The harrow 4 and the plow may be of the ordinary or of any suitable construction. The harrow shown is provided with a series of tooth-bars 5 connected together by longitudinal bars 6 and adapted to be rocked to throw the teeth into a vertical, operative position or in a position to drag upon the ground by means of the lever 7 and rack 8. To the front bar 5 of the harrow, a clevis 9 is connected, said clevis consisting of a metal strap encircling the bar 5 and provided with forwardly extending lugs 10 through which a bolt or pin 11 is passed to pivotally connect said clevis with a link 12, said link being bifurcated at its forward end and the inner surfaces of the bifurcation being curved, as shown at 13, Fig. 3, to permit the harrow to tilt from side to side when connected to the plow, as will hereinafter appear.

The link 12 is pivoted through the opening 14 to the clevis 9 and through the perforation 15 to the lower end of a brace 16 by means of the pin or bolt 17. The brace 16 comprises a vertical member 18 to the lower end of which the link 12 is connected and a long, diagonal, horizontal member secured at 20 by suitable bolts to the sides of the plow beam 1. The brace member 19 of the brace 16 is disposed in a horizontal plane above the mold board 2 so as not to interfere with the turning of the furrow slice. A brace 21 is connected at one end to the bracket 3 secured to the beam of the plow and at its lower end said brace is secured between the spaced lugs 22 of a two-part clamp comprising inwardly extending flanges 23 which engage the vertical member 18 of the brace 16, as shown in Fig. 1, and connects said brace 16 to the brace 21 by means of a bolt 24.

From the foregoing it will be obvious that the link 12 being pivotally connected to the clevis 9 at one end and pivotally connected by the bolt 17 to the brace 16, the harrow 4 will be permitted to tilt from side to side owing to the curved surfaces 13 of the arms of said link. It will also be noted that the only attachment to the plow is the bracket 3 and that the braces 16 and 21 may be readily disconnected from the plow whenever it is desired to use the plow independently of the harrow and that the brace 16 may be readily disconnected from the harrow whenever it is desired to use the harrow independently of the plow. The attachment, as a whole, is simple in construction, can be quickly attached to any plow or harrow, can be readily detached from either or both and can be manufactured at slight cost.

Having thus described the invention, what I claim is:

1. A harrow attachment comprising a brace secured to the plow beam and comprising a horizontal portion and a vertical portion, a clevis secured to the harrow and a link secured to the clevis, said link having a bifurcated front end and the inner walls of said bifurcation being rounded to permit the harrow to tilt from side to side and a secondary brace secured to the plow beam and connected by a clamp to the first named brace, substantially as described.

2. In a harrow attachment, a clevis connected to the harrow, a link pivotally connected to the clevis, said link having bifurcations provided with curved inner surfaces, substantially as described.

3. In a harrow attachment, two braces connected to a plow beam, and a two-part clamp for connecting one of said braces to the other, a link pivotally connected to one of said braces and a harrow clevis connected to said link.

In testimony whereof, I affix my signature in presence of two witnesses.

KARL SCHAAL.

Witnesses:
 JOHN L. JORGENSON,
 E. JACOBS.